(12) United States Patent
Yoshizawa

(10) Patent No.: US 8,532,379 B2
(45) Date of Patent: Sep. 10, 2013

(54) IMAGE PROCESSING APPARATUS AND IMAGE PROCESSING METHOD

(75) Inventor: Masanori Yoshizawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 139 days.

(21) Appl. No.: 13/183,910

(22) Filed: Jul. 15, 2011

(65) Prior Publication Data

US 2012/0020584 A1 Jan. 26, 2012

(30) Foreign Application Priority Data

Jul. 21, 2010 (JP) ................................. 2010-163467

(51) Int. Cl.
*G06K 9/00* (2006.01)
(52) U.S. Cl.
USPC ........... 382/167; 382/172; 382/194; 382/205; 358/3.03; 358/466; 358/448
(58) Field of Classification Search
USPC ................ 382/167, 172, 194, 205; 358/3.03, 358/466, 448
See application file for complete search history.

(56) References Cited

U.S. PATENT DOCUMENTS

| | | | | |
|---|---|---|---|---|
| 5,438,634 A | * | 8/1995 | Kumagai | 382/169 |
| 5,499,111 A | * | 3/1996 | Sato et al. | 382/252 |
| 5,543,855 A | * | 8/1996 | Yamada et al. | 348/753 |
| 5,719,957 A | * | 2/1998 | Nagata et al. | 382/176 |
| 5,870,503 A | * | 2/1999 | Kumashiro | 382/252 |
| 6,115,504 A | * | 9/2000 | Kumashiro | 382/273 |
| 6,603,451 B1 | * | 8/2003 | Mergler et al. | 345/87 |
| 2002/0057459 A1 | * | 5/2002 | Nagarajan et al. | 358/3.03 |

FOREIGN PATENT DOCUMENTS

| | | | |
|---|---|---|---|
| JP | 2008-219291 | | 9/2008 |
| JP | 2008219291 | * | 9/2008 |

* cited by examiner

*Primary Examiner* — Jayesh A Patel
(74) *Attorney, Agent, or Firm* — Finnegan, Henderson, Farabow, Garrett & Dunner, L.L.P.

(57) ABSTRACT

An image processing apparatus including: a determining processing section which binarizes a pixel value of a target pixel using a threshold; a calculation section which calculates feedback values by multiplying binarized pixel values of adjacent processed pixels by a feedback coefficient; a addition section which adds the feedback values to the pixel value of the target pixel before binarization; a diffusion section which diffuses a difference between the binarized pixel value and the unadded pixel value as an error to adjacent unprocessed pixels; and a subtraction section which subtracts the error from the unadded pixel value of the target pixel, wherein when all pixel values of processed pixels are 0 and an output value of the target pixel is a maximum value, it is determined that the target pixel is an isolated point and an output value of an adjacent pixel is set to a forced output value excluding 0.

9 Claims, 12 Drawing Sheets

| PRINT COUNT VALUE | 0~ | 2000~ | 4000~ | 6000~ | 8000~ | 10000~ | 12000~ | 14000~ | 16000~ |
|---|---|---|---|---|---|---|---|---|---|
| FORCED OUTPUT VALUE | 128 | 143 | 159 | 175 | 191 | 207 | 223 | 239 | 255 |

-- Prior Art --

← PORTION WHERE HALFTONE DOT REPRODUCIBILITY IS UNSTABLE →

IMAGE PROCESSING APPARATUS AND IMAGE PROCESSING METHOD

BACKGROUND

1. Field of the Invention

The present invention relates to an image processing apparatus and an image processing method.

2. Description of Related Art

As a method of expressing halftones during image formation, a FM (frequency modulation) screen has been conventionally used. As methods of implementing the FM screen, a method by threshold processing using a dither matrix and a method by error diffusion have been known. When using the threshold processing, a dither matrix having a very large size, for example 256 pixels×256 pixels, is necessary for generating random patterns, and a large amount of memory is necessary for storing the dither matrix. Thus, the method using error diffusion processing is more practical in terms of cost.

When considering a relationship between a pattern of the FM screen and an output device, a pattern such as a green noise pattern in which dot dispersibility is low is desirable for an output device in which dot stability of electrophotography or the like is low. The green noise pattern is a pattern including a lot of intermediate frequency components and by which each dot is prevented from being isolated so that continuous dots are formed.

For example, Japanese Patent Application Laid-Open Publication No. 2008-219291 proposes to execute a feedback calculation processing for generating a green noise pattern in an image processing apparatus which binarizes multi-valued image data by the error diffusion method. The image processing apparatus executes a calculation with reference to output data of surrounding pixels to generate the green noise pattern.

A conventional image processing apparatus 1001 will be described with reference to FIG. 12.

The image processing apparatus 1001 includes a binarization section 1010, a green noise calculation section 1011, an adder 1012, a subtractor 1013, an error diffusion section 1014, and a subtractor 1015. The image processing apparatus 1001 performs various kinds of processings to the input multi-valued data to output binary data.

The binarization section 1010 binarizes multi-valued data in each pixel constituting an image based on a predetermined threshold TH0. More specifically, the binarization section 1010 converts multi-valued data to a maximum value (255 for 256 levels of gradation) when the multi-valued data is equal to or more than the threshold TH0 and to a minimum value (0) when the multi-valued data is less than the threshold TH0.

The green noise calculation section 1011 calculates, with respect to each of one or more processed pixels adjacent to a target value, a value obtained by multiplying binary data obtained by binarization of the binarization section 1010 by a weighting coefficient predetermined for each positional relationship between the target pixel and each of the processed pixels.

The adder 1012 adds each of one or more values calculated by the green noise calculation section 1011 to multi-valued data of the target pixel before binarization to output obtained results to the binarization section 1010.

By the green noise calculation section 1011 and the adder 1012, when the binary data of each of the processed pixels has a maximum value (dot-on), the target pixel is also likely to have a maximum value (dot-on) during binarization. In this manner, a green noise pattern is generated.

The subtractor 1013 subtracts multi-valued data of the target pixel before addition by the adder 1012 from binary data obtained by binarizing the target pixel by the binarization section 1010 to output an obtained result to the error diffusion section 1014.

The error diffusion section 1014 calculates each value obtained by multiplying a value output from the subtractor 1013 by the weighting coefficient predetermined for each positional relationship between the target pixel and one or more unprocessed pixels adjacent to the target pixel to output obtained values to the subtractor 1015.

The subtractor 1015 subtracts each of the values calculated by the error diffusion section 1014 for each of the unprocessed pixels from multi-valued data of each of the unprocessed pixels.

FIG. 13A shows an example of a screen pattern which is processed by the image processing apparatus 1001. FIG. 13A shows a gradation whose density decreases from left to right.

SUMMARY

However, when an image is output by a conventional image processing apparatus using the screen pattern shown in FIG. 13A, as shown in FIG. 13B, while dot reproducibility becomes better with stable dotting due to formation of a green noise pattern in halftones and thereafter, a screen pattern composed of isolated dots is more likely to be formed in a highlight portion (portion in which dots are sparse) and, as a result, dotting becomes unstable and an image with unstable dot reproducibility is output. This becomes particularly conspicuous when an image in higher resolution is output.

An object of the present invention is to provide an image processing apparatus and an image processing method capable of generating a screen pattern with stable dot reproducibility in a highlight portion.

In order to achieve the abovementioned object, according to one aspect of the present invention, there is provided an image processing apparatus including: an output pixel value determining processing section which performs binarization processing to binarize a pixel value of a target pixel in multi-valued image data based on a predetermined threshold to output the binarized pixel value as an output value; a feedback calculation section which calculates one or more feedback values obtained by multiplying one or more binarized pixel values of one or more processed pixels adjacent to the target pixel by a predetermined feedback coefficient; a feedback addition section which adds the one or more feedback values calculated by the feedback calculation section to the pixel value of the target pixel before binarization by the output pixel value determining processing section; an error diffusion section which diffuses a difference between the pixel value of the target pixel binarized by the output pixel value determining processing section and the pixel value of the target pixel before addition by the feedback addition section as an error to one or more pixel values of one or more unprocessed pixels adjacent to the target pixel; and an error subtraction section which subtracts the error diffused by the error diffusion section from the pixel value of the target pixel before the addition by the feedback addition section, wherein when all of the pixel values of one or more processed pixels arranged in predetermined adjacent positions with respect to the target pixel are 0, and when the output value of the target pixel is a maximum value, the output pixel value determining processing section determines that the target pixel is an isolated point and sets an output value of a predetermined adjacent pixel adjacent to the target pixel determined to be the isolated point to a predetermined forced output value excluding 0.

Preferably, the one or more processed pixels arranged in adjacent positions with respect to the target pixel is one or more processed pixels adjacent to the target pixel, and when all of the feedback values added to the pixel value of the target pixel by the feedback addition section are 0, the output pixel value determining processing section determines that all of the pixel values of the one or more processed pixels arranged in the predetermined adjacent positions with respect to the target pixel are 0.

Preferably, when the pixel value of the target pixel is output as the forced output value by the output pixel value determining processing section, the error diffusion section diffuses the difference between the pixel value as the forced output value and the pixel value of the target pixel before the addition by the feedback addition section as the error to the one or more pixel value of the one or more unprocessed pixels adjacent to the target pixel.

Preferably, the image data including a plurality of pixels arranged in a matrix shape, and the output pixel value determining processing section performs the binarization processing while sequentially moving the target pixel in a main scanning direction and sets the pixel to be processed next to the target pixel determined to be the isolated point to the forced output value.

Preferably, the output pixel value determining processing section determines whether or not the target pixel is in a highlight portion, and when it is determined that the target pixel is in the highlight portion, determines whether or not the target pixel is an isolated point.

Preferably, a forced output value setting section which sets the forced output value, wherein the output pixel value determining processing section sets the output value of the predetermined adjacent pixel adjacent to the target pixel determined to be the isolated point to the value set by the forced output value setting section.

Preferably, the forced output value setting section is capable of receiving a specifying input of the forced output value, and when receiving the specifying input of the forced output value, sets the forced output value to a value of the specifying input.

Preferably, the forced output value setting section is capable of receiving information output from an image forming apparatus which forms an image on paper, which information indicates a state of the image forming apparatus, and when receiving the information indicating the state of the image forming apparatus, sets the forced output value to the value corresponding to the received information.

Moreover, according to one aspect of the present invention, there is provided an image processing method comprising the steps of: performing binarization processing to binarize a pixel value of a target pixel in multi-valued image data based on a predetermined threshold to output the binarized pixel value as an output value; calculating one or more feedback values obtained by multiplying one or more binarized pixel values of one or more processed pixels adjacent to the target pixel by a predetermined feedback coefficient; adding the one or more feedback values calculated in the feedback calculation step to the pixel value of the target pixel before binarization in the output pixel value determining processing step; diffusing a difference between the pixel value of the target pixel binarized in the output pixel value determining processing step and the pixel value of the target pixel before addition in the feedback addition step as an error to one or more pixel values of one or more unprocessed pixels adjacent to the target pixel; and subtracting the error diffused in the error diffusion step from the pixel value of the target pixel before the addition in the feedback addition step, wherein when all of the pixel values of one or more processed pixels arranged in predetermined adjacent positions with respect to the target pixel are 0, and when the output value of the target pixel is a maximum value, it is determined in the output pixel value determining processing step that the target pixel is an isolated point and an output value of a predetermined adjacent pixel adjacent to the target pixel determined to be the isolated point is set to a predetermined forced output value excluding 0.

BRIEF DESCRIPTION OF THE DRAWINGS

The present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

Figure 1:
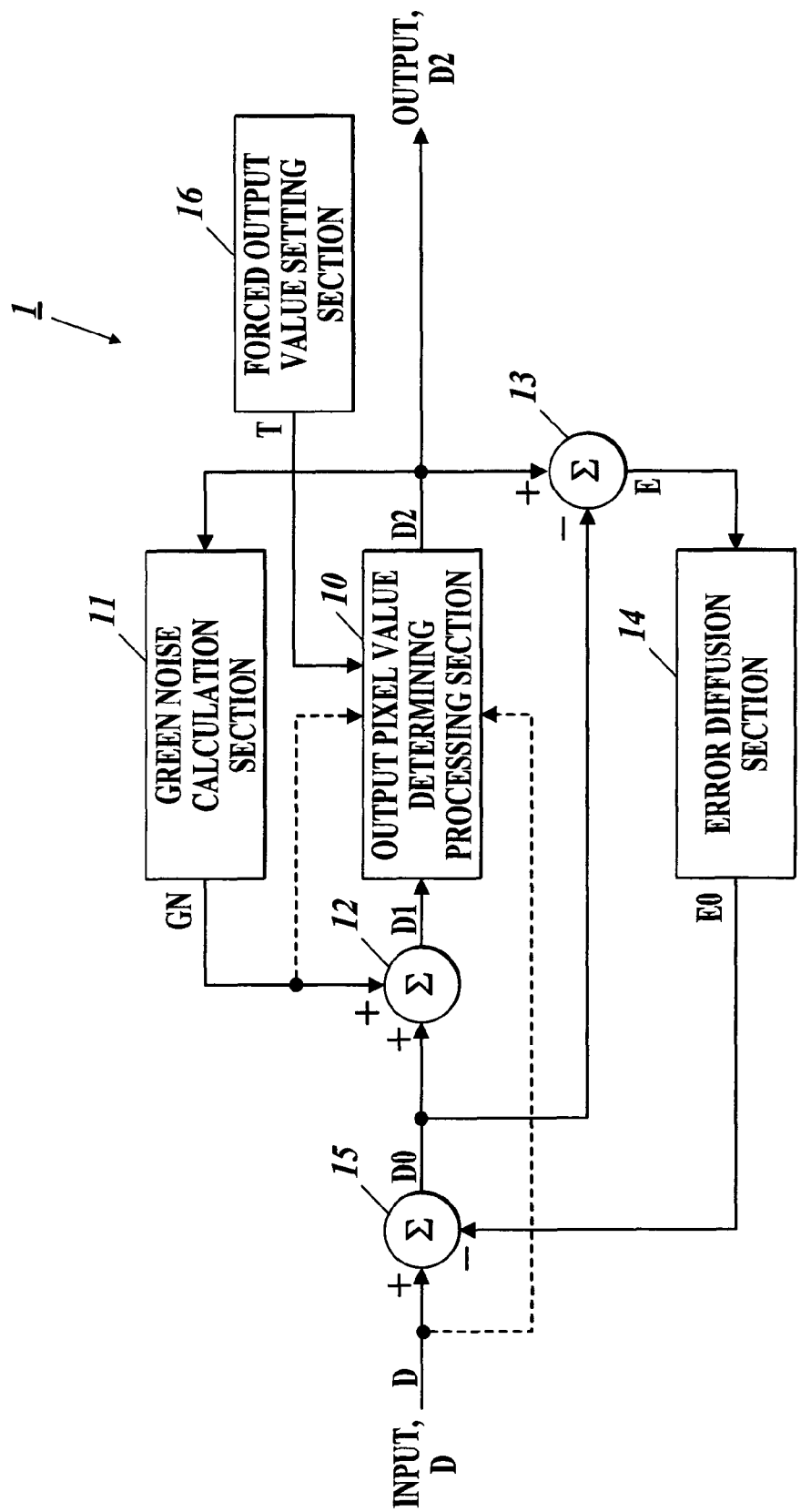
FIG. 1 is a block diagram showing a configuration of an image processing apparatus according to the present embodiment.

An image processing apparatus according to an embodiment of the present invention will be described below with reference to drawings. In this regard, however, the scope of the invention is not limited to the shown examples. In the following description, the same reference numerals are used for respective sections having the same function and configuration, and the explanation thereof will not be repeated.

As an image processing apparatus according to the present invention, for examples, a printer, copier, facsimile, and MFP (Multi-functional peripheral) combining these functions can be cited. However, the present invention is not limited to the above as long as it is an image processing apparatus which performs processing to convert multi-valued data of each pixel constituting an image into multi-valued data.

An image processing apparatus 1 according to the embodiment of the present invention includes, for example, an output pixel value determining processing section 10, a green noise calculation section 11, an adder 12, a subtractor 13, an error diffusion section 14, a subtractor 15, and a forced output value setting section 16. The image processing apparatus 1 is an apparatus which receives an input of multi-valued data (D) and performs various kinds of processings to the multi-valued data (for example, 256 values) to output multi-valued data (D2) (for example, three values).

Processing in each section constituting the image processing apparatus 1 may be performed by dedicated hardware, or may be realized by software processing by cooperation between programmed processing and a CPU (central processing unit). As a computer-readable medium for a program, a nonvolatile memory such as a ROM (read only memory) and flash memory, or a portable recording medium such as a CD-ROM can be applied to the present invention. Alternatively, a carrier wave can be applied as a medium to provide the program data of the embodiment via a communication line.

Figure 2:
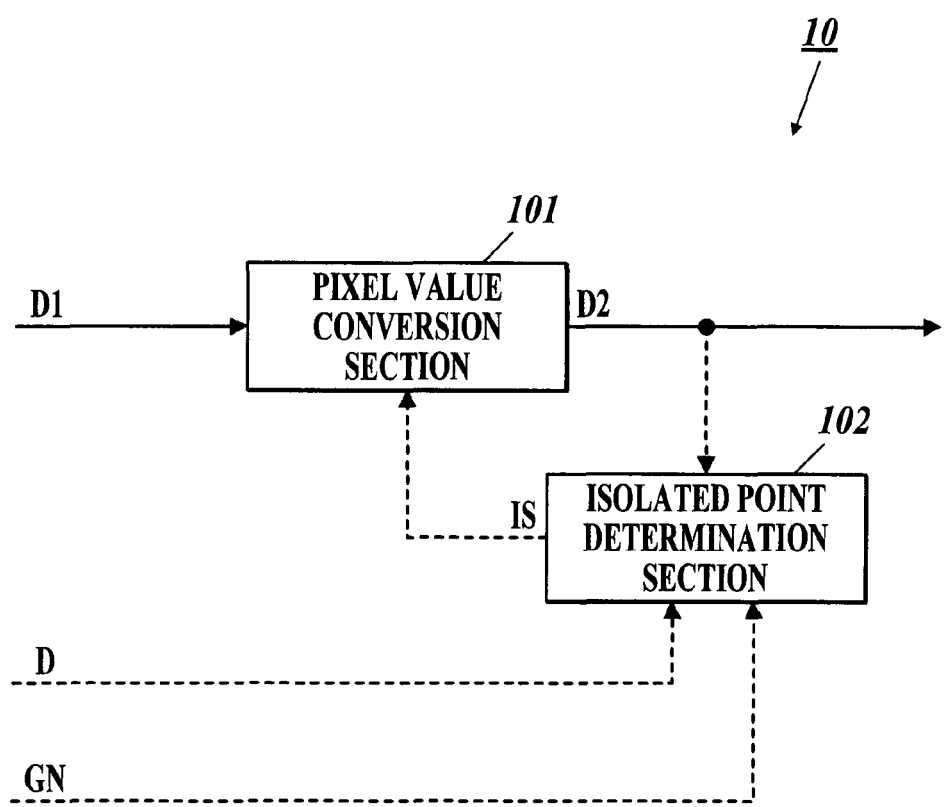
FIG. 2 is a block diagram showing a configuration of an output pixel value determining processing section.

As shown in FIG. 2, the output pixel value determining processing section 10 includes a pixel value conversion section 101 and an isolated point determination section 102.

The pixel value conversion section 101 binarizes multi-valued data in each pixel constituting an image based on a predetermined threshold TH0. More specifically, the pixel value conversion section 101 converts a pixel value to a maximum value (255 for 256 levels of gradation) when multi-valued data (D1) is equal to or more than the threshold TH0 and to the minimum value (0) when the multi-valued data (D1) is less than the threshold TH0. The threshold TH0 can be set arbitrarily and is set to, for example, "128" in the embodiment. As will be described below, when there is a pixel determined to be an isolated point, the pixel value conversion section 101 converts a pixel value of a pixel which is processed next into a forced output value (T) set in advance regardless of the value indicated by multi-valued data (D1). Then, the pixel value conversion section 101 outputs the converted multi-valued data (D2) to the green noise calculation section 11, the subtractor 13, and the isolated point determination section 102.

As will be described below, when the converted multi-valued data (D2) is the maximum value, the isolated point determination section 102 determines whether or not the pixel whose pixel value is converted is an isolated point having no dotting in surrounding pixels thereof based on input multi-valued data (D) and a green noise value (GN) as a feedback value output from the green noise calculation section 11. Then, the isolated point determination section 102 outputs a determination value (IS), which is information indicating a determination result, to the pixel value conversion section 101.

The green noise calculation section 11 as a feedback calculation section calculates, with respect to each of one or more processed pixels adjacent to the target pixel, namely with respect to one or more processed pixels placed at predetermined positions subjected to feedback with respect to the target pixel, a green noise value by multiplying the multi-valued data obtained by pixel value conversion in the output pixel value determining processing section 10 by the weighting coefficient (weighting coefficient≧0) as a feedback coefficient predetermined for each positional relationship between each of the processed pixels and the target pixel. Here, a processed pixel is a pixel whose processing is completed when the target pixel is processed.

Figure 3:
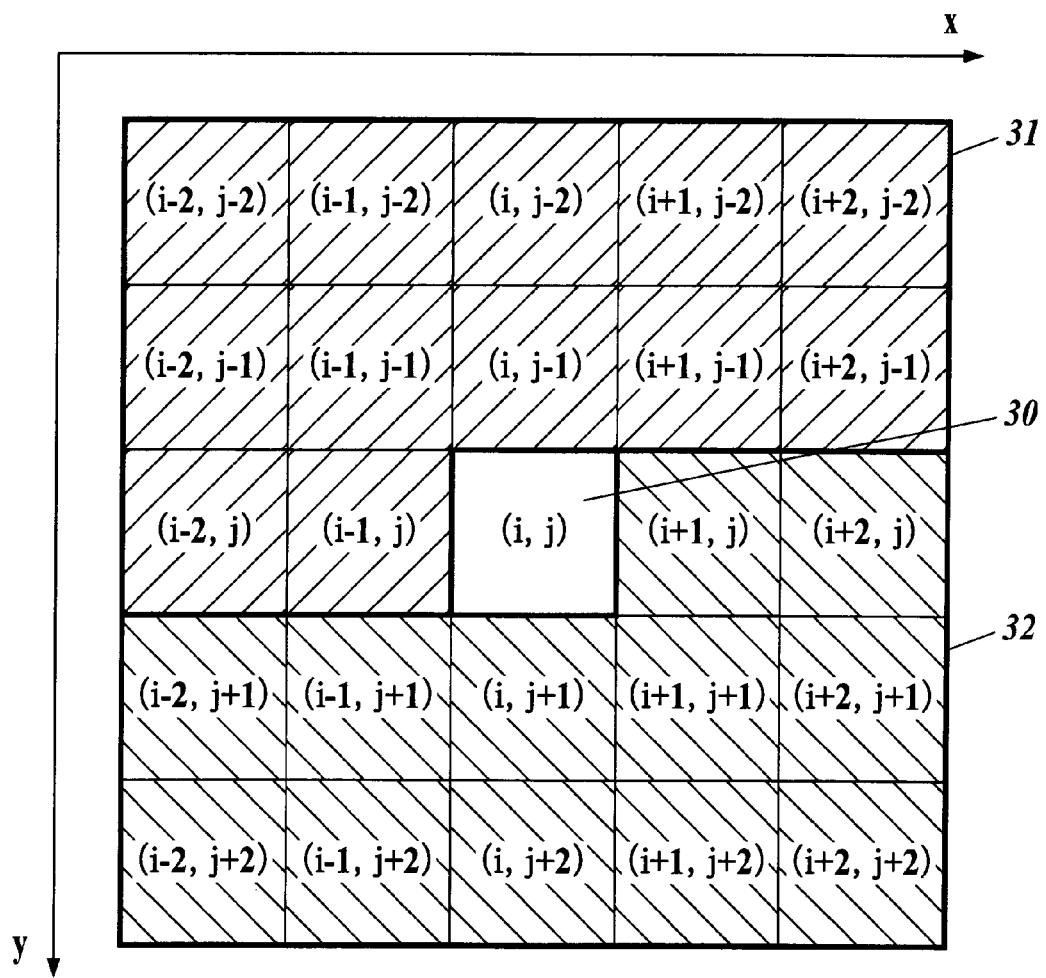
FIG. 3 is a diagram showing a positional relationship among a target pixel, processed pixels and unprocessed pixels.

As shown in FIG. 3, it is assumed that a position of each pixel constituting an image is represented by two directions of x and y and processing is performed from left to right (main scanning direction) in the x direction and from up to down in the y direction (sub-scanning direction). When the pixel at position (i, j) is a target pixel 30, each pixel at positions (i−2, j−2) to (i+2, j−2), (i−2, j−1) to (i+2, j−1), (i−2, j), (i−1, j) is a processed pixel 31. The green noise calculation section 11 multiplies the result (multi-valued data) of pixel value conversion processing of each of the processed pixels 31 by the weighting coefficient depending on the positional relationship between the target pixel 30 and each of the processed pixels 31. It is especially desirable to feedback to the target pixel 30 processing results of the pixels at positions (i−1, j−1), (i, j−1), (i+1, j−1), (i−1, j) adjacent to the target pixel 30 among the processed pixels 31, namely to increase the value of the weighting coefficient. The range of the processed pixels 31 is not limited to the range shown in FIG. 3. The weighting coefficient set for each of the processed pixels 31 can be set appropriately. In the embodiment, for example, "0.5" is set for each of the pixels at positions (i, j−1) and (i−1, j), and "0" is set for another processed pixels 31.

The adder 12 as a feedback addition section adds one or more green noise values (GN) calculated by the green noise calculation section 11 to multi-valued data (D0) of the target pixel before pixel value conversion, and outputs the multi-valued data (D1) after addition to the output pixel value determining processing section 10.

By the green noise calculation section 11 and the adder 12, when the multi-valued data of the processed pixel adjacent to the target pixel is the maximum value (dot-on), the target pixel is also likely to have the maximum value (dot-on) after pixel value conversion. Thus, the green noise calculation section 11 and the adder 12 generate a green noise pattern. The green noise pattern is a pattern for obtaining an image in which dot dispersibility is low and dots are continuously formed. The green noise pattern has a small number of low and high frequency components, and has a large number of intermediate frequency components.

The subtractor 13 subtracts multi-valued data (D0) of the target pixel before addition by the adder 12 from multi-valued data (D2) of the target pixel which is obtained by pixel value conversion in the output pixel value determining processing section 10, and outputs an obtained value (E) to the error diffusion section 14. The subtractor 13 executes the subtraction regardless of whether the multi-valued data (D2) obtained by pixel value conversion in the output pixel value determining processing section 10 is the maximum value, minimum value, or forced output value (T).

The error diffusion section 14 calculates each value (diffusion error value: E0) obtained by multiplying the value (E) output from the subtractor 13 by the weighting coefficient predetermined for each positional relationship between the target pixel and each of one or more unprocessed pixels adjacent to the target pixel, namely each of one or more unprocessed pixels placed at predetermined positions subjected to error diffusion with respect to the target pixel), and outputs the calculated values to the subtractor 15. Here, an unprocessed pixel is a pixel whose processing is not completed when the target pixel is processed. The sum of the weighting coefficients of the unprocessed pixels to which a pixel value conversion error of the certain target pixel should be diffused is 1.

As shown in FIG. 3, when the pixel at position (i, j) is the target pixel 30, each pixel at positions (i+1, j), (i+2, j), (i−2, j+1) to (i+2, j+1), (i−2, j+2) to (i+2, j+2) is an unprocessed pixel 32. The error diffusion section 14 multiplies the pixel value conversion error of the target pixel by the weighting coefficient depending on the positional relationship between the target pixel 30 and each of the unprocessed pixels 32. It is especially desirable to feedback the pixel value conversion error of the target pixel 30 to each pixel in positions (i+1, j), (i−1, j+1), (i, j+1), (i+1, j+1) adjacent to the target pixel 30 among the unprocessed pixels 32, namely to increase the value of the weighting coefficient. The range of the unprocessed pixels 32 is not limited to the range shown in FIG. 3.

The subtractor 15 as an error subtraction section subtracts each of one or more error diffusion values (E0) calculated by the error diffusion section 14 for each unprocessed pixel from the multi-valued data (D) of the unprocessed pixel, and outputs the multi-valued data (D0).

The forced output value setting section 16 is connected to an image forming apparatus which forms an image on paper, an operation section which can be operated by the user, a terminal apparatus connected to a network or the like to receive an input of information which is output from these apparatus or section. Then, the forced output value setting section 16 sets the forced output value (T) based on the input information, and outputs the set forced output value (T) to the output pixel value determining processing section 10, as described below.

Figure 4:
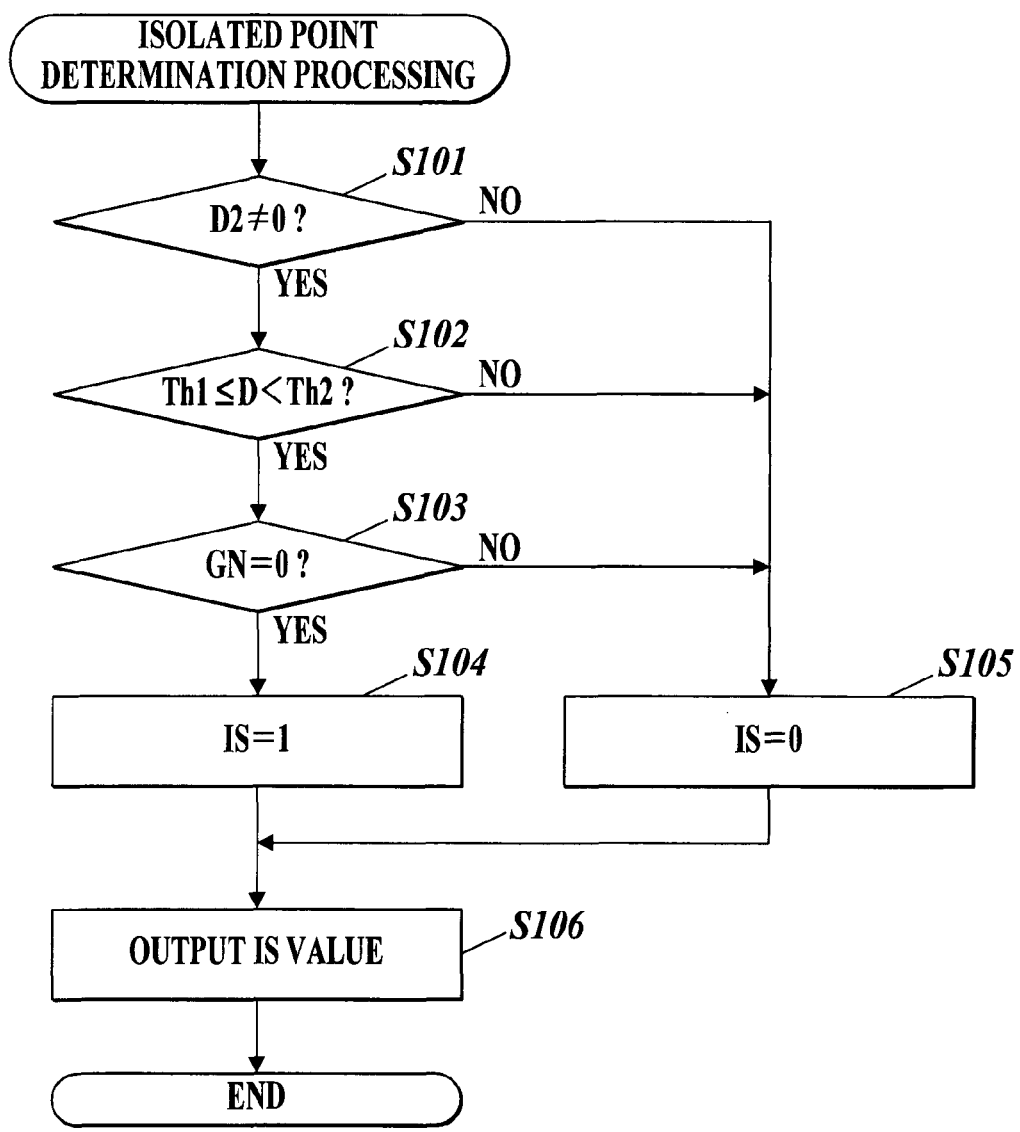
FIG. 4 is a flowchart showing isolated point determination processing to be performed by an isolated point determination section.

Next, isolated point determination processing to be performed by the isolated point determination section 102 of the image processing apparatus 1 configured as described above will be described with reference to FIG. 4. The isolated point determination processing is performed when the multi-valued data (D2) after conversion output from the pixel value conversion section 101 is input.

First, the isolated point determination section 102 determines whether or not the input multi-valued data (D2) is "0" (step S101). When it is determined that the input multi-valued data (D2) is not "0", in other words, when it is determined that there is a dot (step S101: Y), the isolated point determination section 102 receives an input of the multi-valued data (D) of the target pixel among the multi-valued data input to the image processing apparatus 1 to determine whether or not the target pixel is a highlight portion (step S102). More specifically, when the input multi-valued data (D) is equal to or more than a first threshold (Th1) and less than a second threshold (Th2), the isolated point determination section 102 determines that the target pixel is a highlight portion. In the embodiment, the first threshold is set to "0" and the second threshold to "80", but each threshold can be set arbitrarily.

When it is determined that the target pixel is the highlight portion (step S102: Y), the isolated point determination section 102 receives an input of the green noise values (GN) output from the green noise calculation section 11 to determine whether or not a sum total thereof is "0" (step S103). In other words, the isolated point determination section 102 determines whether or not a dot exists in none of the processed pixels adjacent to the target pixel.

When it is determined that the sum total of the green noise values (GN) is "0" (step S103: Y), the isolated point determination section 102 sets the determination value (IS) to "1", which indicates that the target pixel is an isolated point, (step S104) and performs processing in step S106.

On the other hand, when it is determined that the input multi-valued data (D2) is "0" in step S101, in other words, when it is determined that there is no dot (step S101: N), the isolated point determination section 102 sets the determination value (IS) to "0", which indicates that the target pixel is not an isolated point (step S105) and performs processing in step S106.

When it is not determined that the target pixel is the highlight portion (step S102: N) in step S102, or when it is not determined that the sum total of the green noise values (GN) is "0" (step S103: N) in step S103, the isolated point determination section 102 performs processing in step S105, and then performs processing in step S106.

In step S106, the isolated point determination section 102 outputs the set determination value (IS) to the pixel value conversion section 101 (Step S106), and ends the processing.

Figure 5:
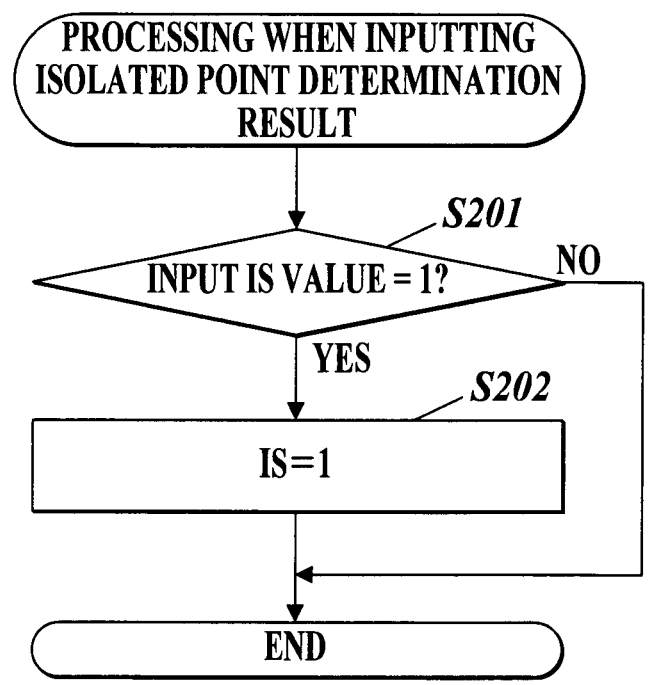
FIG. 5 is a flowchart showing processing when inputting isolated point determination result to be performed by a pixel value conversion section.

Next, the processing when inputting isolated point determination result to be performed in the pixel value conversion section 101 will be described with reference to FIG. 5. The processing when inputting isolated point determination result is processing to be performed when the pixel value conversion section 101 receives an input of the determination value (IS) output from the isolated point determination section 102.

First, the pixel value conversion section 101 determines whether or not the input determination value (IS) is "1" (step S201). When it is determined that the input determination value (IS) is "1" (step S201: Y), the pixel value conversion section 101 sets the IS value to "1" (step S202), and ends the processing. On the other hand, when it is not determined that the input determination value (IS) is "1" (step S201: N), the pixel value conversion section 101 ends the processing without performing the processing in step S202.

Figure 6:
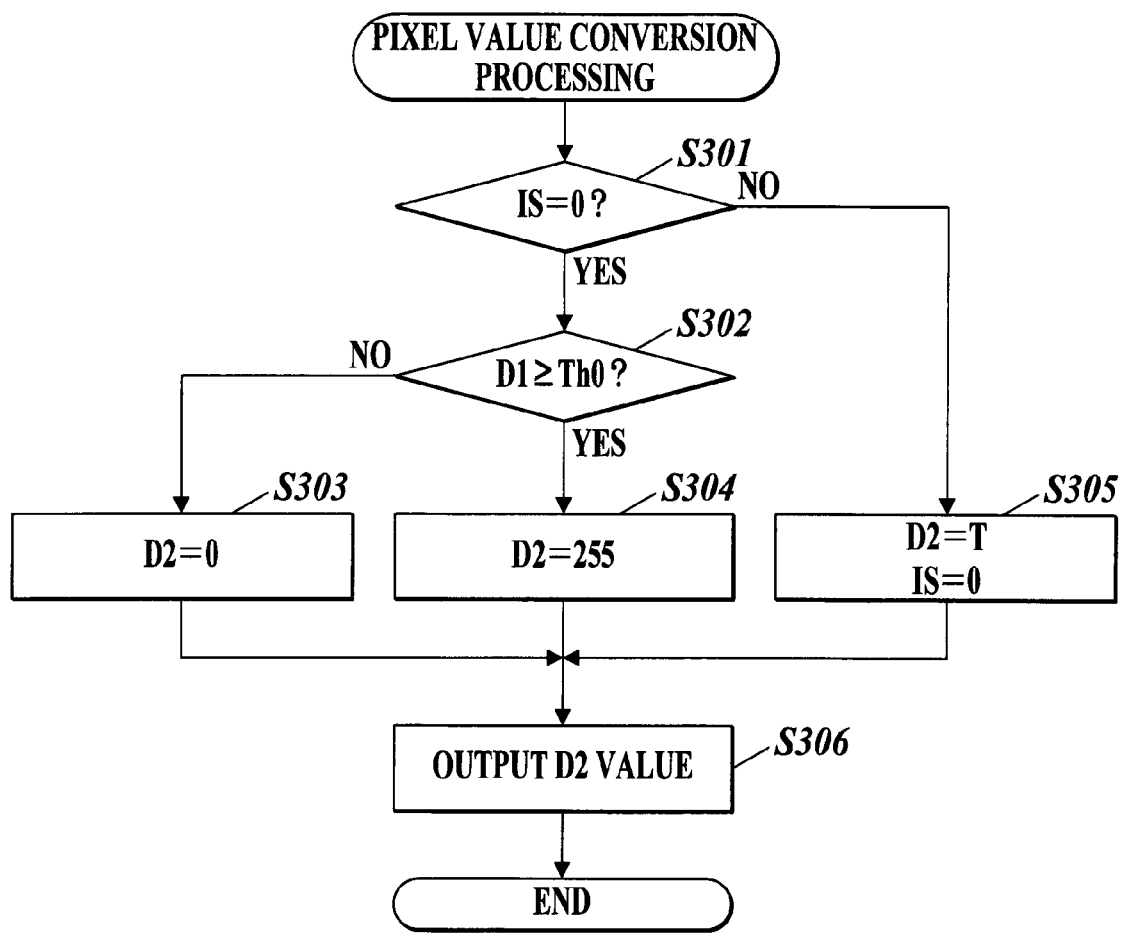
FIG. 6 is a flowchart showing pixel value conversion processing to be performed by the pixel value conversion section.

Next, pixel value conversion processing to be performed in the pixel value conversion section 101 will be described with reference to FIG. 6. The pixel value conversion processing is processing to be performed when the multi-valued data (D1) is input into the pixel value conversion section 101.

First, the pixel value conversion section 101 refers to the IS value to determine whether or not the IS value is "0" (step S301). When it is determined that the IS value is "0", in other words, when it is determined that the target pixel is not the isolated point (step S301: Y), the pixel value conversion section 101 determines whether or not the input multi-valued data (D1) is equal to or more than the threshold Th0 (step S302). Then, when it is not determined that the input multi-valued data (D1) is equal to or more than the threshold Th0 (step S302: N), the pixel value conversion section 101 sets the minimum value "0" as the multi-valued data (D2) after conversion (step S303), and performs processing in step S306.

On the other hand, when it is determined that the input multi-valued data (D1) is equal to or more than the threshold Th0 (step S302: Y), the pixel value conversion section 101 sets the maximum value "255" as the multi-valued data (D2) after conversion (step S304), and performs processing in step S306.

When it is not determined that the IS value is "0", in other words, when it is determined that the target pixel is the isolated point (step S301: N) in step S301, the pixel value conversion section 101 sets the forced output value (T) output from the forced output value setting section 16 as the multi-valued data (D2) after conversion, sets the IS value to "0" (step S305), and proceeds to processing in step S306.

Then, the pixel value conversion section 101 outputs the multi-valued data (D2) after conversion set in each step S303, S304, or S305 in step S306, and then ends the processing.

Figure 7A:
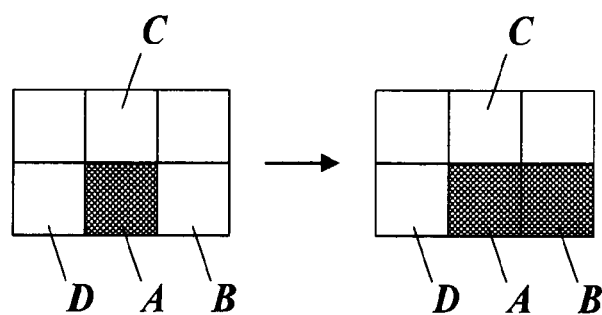
FIG. 7A is a diagram showing a processing result by the pixel value conversion processing.

According to the image processing apparatus 1 configured as described above, as shown in FIG. 7A for example, when a target pixel A is dotted and the target pixel A is the isolated point because none of processed pixels C, D adjacent thereto is dotted, a pixel B to be processed next is dotted based on the forced output value (T).

Figure 7B:
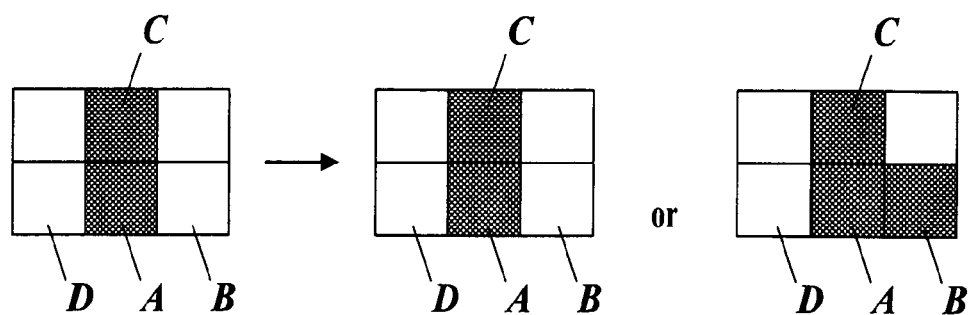
FIG. 7B is a diagram showing a processing result by the pixel value conversion processing.

As shown in FIG. 7B for example, when the target pixel A is dotted and at least one of the processed pixels C, D adjacent thereto is dotted, with respect to the pixel B to be processed next, binarization processing for multi-valued data (D1) is performed based on the threshold Th0 using the pixel B as the target pixel, as described above.

In the embodiment, the isolated point (isolated dot) is prevented from being formed in this manner.

Figure 8:
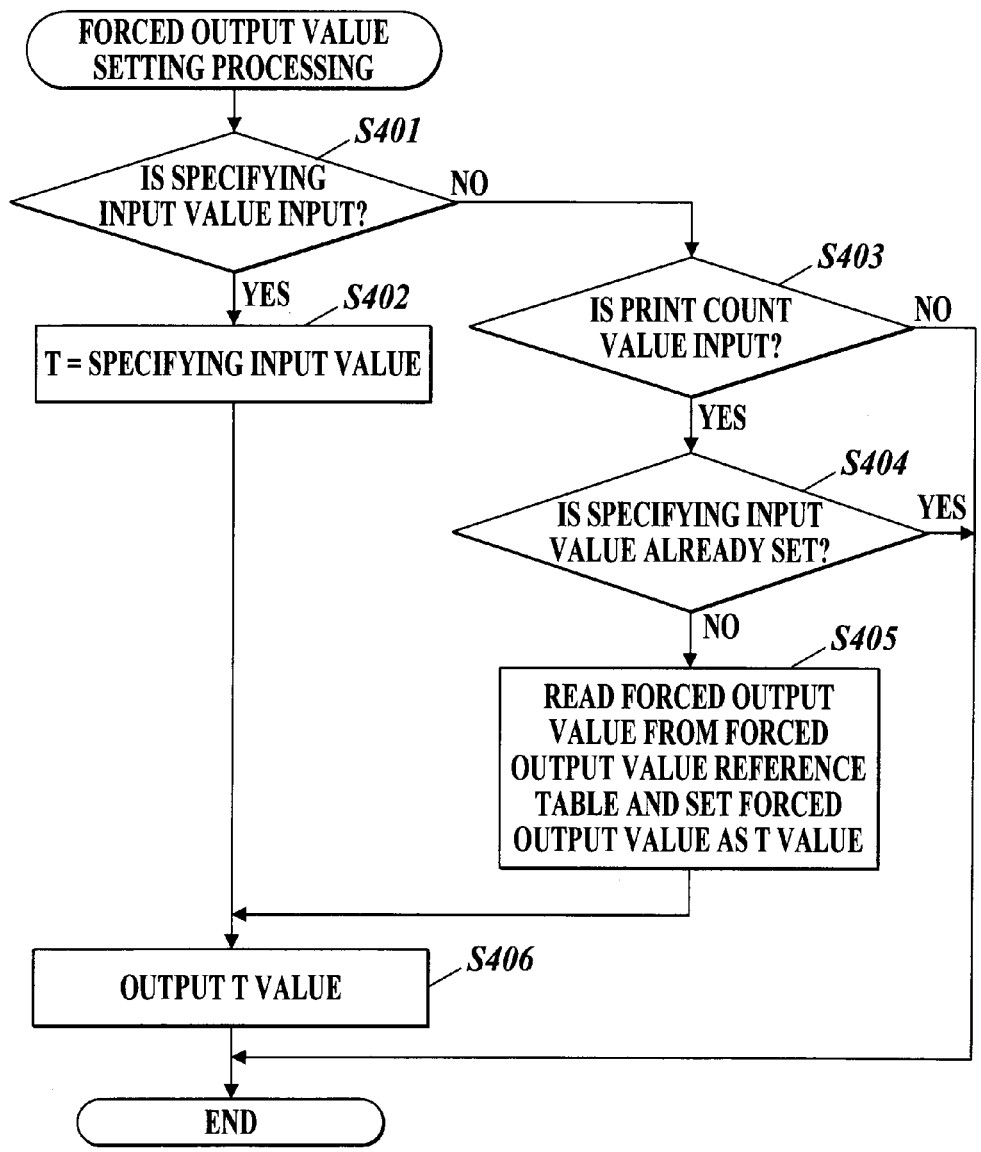
FIG. 8 is a flowchart showing forced output value setting processing to be performed by a forced output value setting section.

Next, forced output value setting processing to be performed in the forced output value setting section 16 will be described with reference to FIG. 8. The forced output value setting processing is performed, for example, at predetermined intervals.

First, the forced output value setting section 16 determines whether or not a specifying input value is input from a not-shown operation section or terminal apparatus (step S401). When it is determined that the specifying input value is input (step S401:Y), the forced output value setting section 16 sets the input specifying input value as the forced output value (T) (step S402), and performs processing in step S406.

On the other hand, when it is not determined that the specifying input value is input (step S401: N), the forced output value setting section 16 determines whether or not a print count value is input from a not-shown image forming apparatus (step S403). The print count value is a value indicating, for example, a usage amount of each section related to image formation in an image forming apparatus. In the embodiment, for example, the print count value is input to the forced output value setting section 16 from the image forming apparatus, which print count value indicates the number of times of image formation after a photosensitive unit as an image carrier in an electrophotographic image forming apparatus is replaced. The value indicating the usage amount of each section related to image formation in the image forming apparatus is not limited to the value regarding the photosensitive unit, and also values regarding a light source such as a LD (laser diode) which exposes a photosensitive member, or fixing section, of the image forming apparatus, can appropriately be set.

When it is determined that the print count value is input (step S403: Y), the forced output value setting section 16 determines whether or not the forced output value (T) is already set as the specifying input value in step S402 (step S404). On the other hand, when it is not determined that the print count value is input (step S403: N), the forced output value setting section 16 ends the processing.

Figures 9, 10:
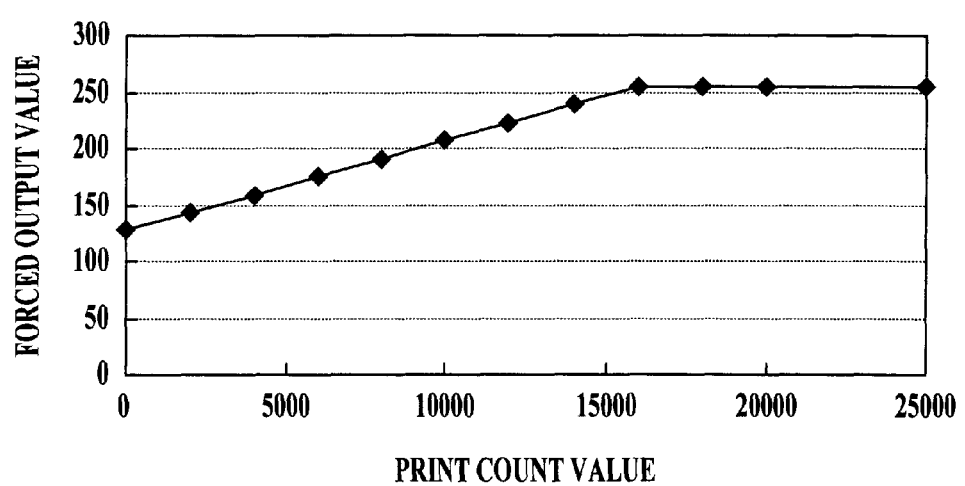
FIG. 9 is a diagram showing an example of a table for setting a forced output value.
FIG. 10 is a diagram showing an example of a table for setting the forced output value.

Then, in step S404, when it is not determined that the forced output value (T) is already set as the specifying input value (step S404: N), the forced output value setting section 16 reads a value corresponding to the input print count value from a forced output value reference table as shown in FIG. 9 to set the value as the forced output value (T) (step S405), and then performs processing in step S406. According to the forced output value reference table, the forced output value (T) is set to be larger, as the number of times of image formation increases. By making the forced output value (T) changeable by using halftones, for example, energy adjustment of a light source becomes possible. By this, dotting process is executed with an energy amount depending on the state of the photosensitive member or light source which deteriorates with use so that stable dotting can be realized. In the embodiment, for example, while the forced output value (T) is made smaller immediately after the photosensitive unit is replaced because dotting operation is stable even for one isolated pixel, the forced output value (T) is made larger when the photosensitive section deteriorates with use because dotting operation becomes unstable, in order to ensure stable dotting operation.

Instead of the forced output value reference table shown in FIG. 9, for example, as shown in FIG. 10, a LUT (look up table) whose input is the print count value and whose output is the forced output value may be used.

On the other hand, when it is determined that the forced output value (T) is already set as the specifying input value (step S404:Y), the forced output value setting section 16 ends the processing.

Then, in step S406, the forced output value setting section 16 outputs the forced output value (T) set as described above to the output pixel value determining processing section 10, and ends the processing.

Figure 11A:
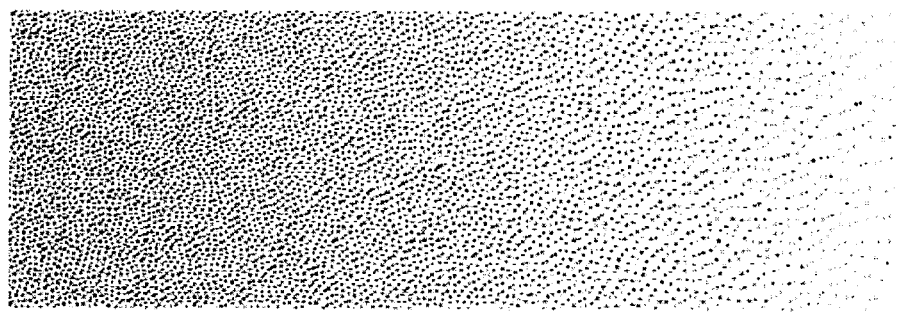
FIG. 11A is a diagram showing a screen pattern which is processed by the image processing apparatus according to the embodiment.
Figure 13A:
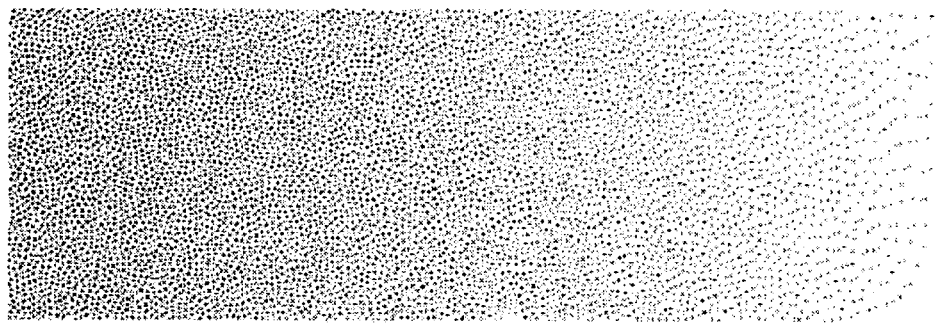
FIG. 13A is a diagram showing a screen pattern which is processed by the conventional image processing apparatus.

FIG. 11A shows an example of the screen pattern which is processed by the image processing apparatus 1 configured as described above. FIG. 11A shows a gradation whose density decreases from left to right. In the example of FIG. 11A, it is clear that isolated dots in a highlight portion are suppressed, compared with the example of the screen pattern which is processed by the conventional image processing apparatus 1001 shown in FIG. 13A.

Figure 11B:
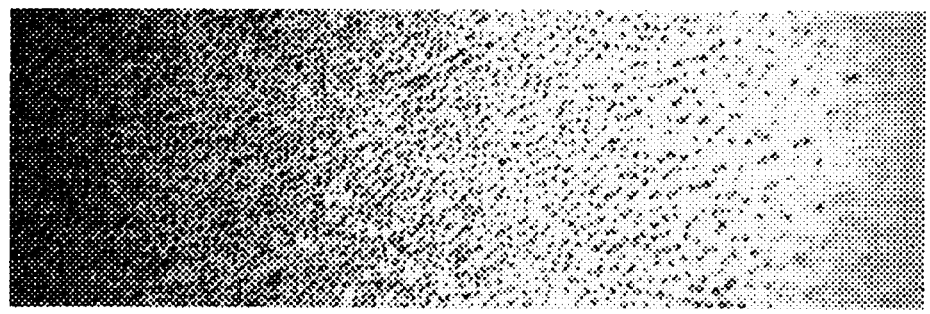
FIG. 11B is a diagram showing an output result of the screen pattern which is processed by the image processing apparatus according to the embodiment.
Figure 12:
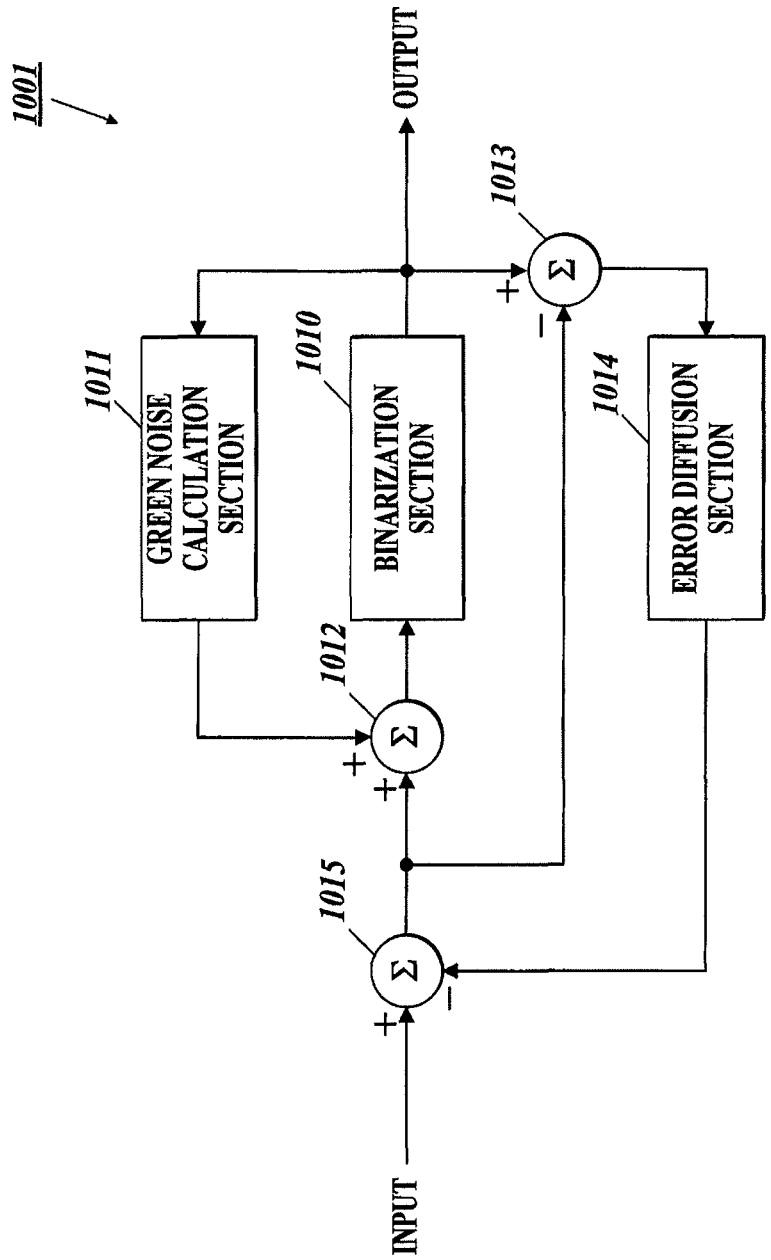
FIG. 12 is a block diagram showing a configuration of a conventional image processing apparatus.
Figure 13B:
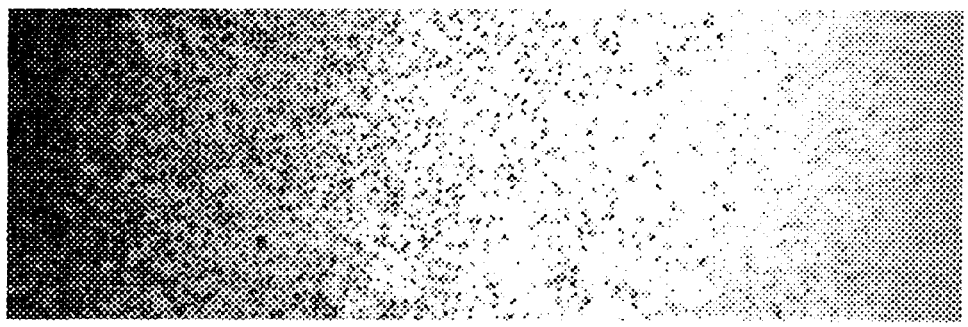
FIG. 13B is a diagram showing an output result of the screen pattern which is processed by the conventional image processing apparatus.

FIG. 11B shows an output result of an image by the screen pattern shown in FIG. 11A. As shown in the output result of FIG. 11B compared with the output result of FIG. 13B, it is clear that the screen pattern processed by the image processing apparatus 1 of the embodiment achieves stable dotting also in a highlight portion. Thus, according to the embodiment, it becomes possible to obtain the output result of the image having stable dot reproducibility.

As described above, according to the embodiment of the present invention, the output pixel value determining processing section 10 performs binarization processing to binarize the pixel value (D1) of the target pixel in multi-valued image data based on the predetermined threshold Th0 to output the binarized pixel value as an output value (D2). The green noise calculation section 11 calculates the green noise value (GN) obtained by multiplying the binarized pixel value of the one or more processed pixels adjacent to the target pixel by a predetermined green noise coefficient. The adder 12 adds the one or more green noise values (GN) calculated by the green noise calculation section 11 to the pixel value (D0) of the target pixel before binarization by the output pixel value determining processing section 10. The error diffusion section 14 diffuses a difference between the pixel value (D2) of the target pixel binarized by the output pixel value determining processing section 10 and the pixel value (D0) of the target pixel before addition by the adder 12 as an error (E) to the pixel value of the one or more unprocessed pixels adjacent to the target pixel. The subtractor 15 subtracts the error (E0) diffused by the error diffusion section 14 from the pixel value (D) of the target pixel before the addition by the adder 12. Then, when all of the pixel values of the one or more processed pixels arranged in predetermined adjacent positions with respect to the target pixel are 0, and when the output value (D2) of the target pixel is the maximum value (255), the output pixel value determining processing section 10 determines that the target pixel is the isolated point. Then, the output pixel value determining processing section 10 sets the output value of predetermined adjacent pixel adjacent to the target pixel determined to be the isolated point to the predetermined forced output value excluding 0. As a result, the isolated dots are prevented from being formed in the highlight portion so that the screen pattern having stable dot reproducibility can be generated also in the highlight portion. Particularly, even when the screen pattern is in high resolution, dot reproducibility can be stabilized.

The output pixel value determining processing section 10 of the embodiment determines that all pixel values of the one or more processed pixels arranged in the predetermined adjacent positions with respect to the target pixel are 0, when all the green noise values (GN) added to the pixel value (D0) of the target pixel by the adder 12 are 0. As a result, since it can be determined that all of the pixel values of the processed pixels arranged in the predetermined adjacent positions with respect to the target pixel can be determined to be 0 by the green noise values, processing is simplified and processing efficiency can be improved.

When the pixel value of the target pixel is output as the forced output value (T) by the output pixel value determining processing section 10, the error diffusion section 14 of the embodiment diffuses a difference between the pixel value (D2) which is the forced output value (T) and the pixel value (D0) of the target pixel before addition by the adder 12 as an error (E) to the pixel values of one or more unprocessed pixels adjacent to the target pixel. As a result, after being dotted with the forced output value, excessive dotting is suppressed by error diffusion processing, and thereby gradation can be maintained.

Moreover, the output pixel value determining processing section 10 of the embodiment performs binarization processing while sequentially moving the target pixel in the main scanning direction, and sets the value of the pixel to be processed next to the target pixel which is determined to be the isolated point to the forced output value (T). Consequently, a period within which the determination result of the isolated point should be held can be short, and thereby the processing can be simplified.

Furthermore, the output pixel value determining processing section 10 of the embodiment determines whether or not the target pixel is in the highlight portion. Then, when it is determined that the target pixel is in the highlight portion, the output pixel value determining processing section 10 performs determination of the isolated point with respect to the target pixel. As a result, excessive dotting can be prevented after executing feedback using green noise so that degradation of image quality can be suppressed.

Moreover, the forced output value setting section 16 of the embodiment sets the forced output value (T). The output pixel value determining processing section 10 sets the output value of predetermined adjacent pixel adjacent to the target pixel determined to be the isolated point to the value set by the forced output value setting section 16. As a result, for example, the output amount can be adjusted while dotting during image formation so that the output results can be adjusted while stabilizing dot reproducibility.

When receiving the specifying input of the forced output value (T), the forced output value setting section 16 of the embodiment sets the forced output value (T) to the specified value. As a result, the output results can be adjusted to user's preferences.

When receiving the print count value, the forced output value setting section 16 of the embodiment sets the forced output value (T) to the value corresponding to the received print count value. As a result, the output amount at the time of dotting during image formation can be adjusted depending on the state of the image forming apparatus, and thereby stable dotting can be maintained.

The description of the embodiment is mere examples of the image processing apparatus according to the present invention and the present invention is not limited to the examples. A detailed configuration or a detailed operation of each functional section constituting the image processing apparatus can also be changed appropriately.

Moreover, in the embodiment whether or not the target pixel is the isolated point is determined by determining whether or not the sum total of green noise values added to multi-valued data of the target pixel before pixel value conversion is "0", but whether or not the target pixel is the isolated point may be determined by referring to other information than the green noise value. For example, it is possible to separately hold information indicating whether or not dotting is performed with respect to the one or more processed pixels adjacent to the target pixel to determine whether or not the target pixel is the isolated point based on the information.

Furthermore, in the embodiment, since whether or not the target pixel is the isolated point is determined by referring to the sum total of green noise values, the pixels used for determining whether or not the target pixel is the isolated point and the pixels used for calculating the green noise values are the same. However, the pixels used for determining whether or not the target pixel is the isolated point and the pixels used for calculating the green noise values do not have to be the same. For example, when FIG. 3 is referred to, it is possible to use the pixels in positions (i−2, j−2) to (i+2, j−2), (i−2, j−1) to (i+2, j−1), (i−2, j), (i−1, j) for calculating the green noise values, while using the pixels in positions (i, j−1), (i−1, j) for determining whether or not the target pixel is the isolated point.

Moreover, in the embodiment the above error diffusion processing is performed also when the output value after pixel value conversion is the forced output value, but the error diffusion processing may not be performed when the output value after pixel value conversion is the forced output value.

Furthermore, the embodiment is configured so that the output value of the pixel to be processed next in the main scanning direction is set to the forced output value when the target pixel is determined to be the isolated point, but the output value of another pixel adjacent to the target pixel may be set to the forced output value. For example, the output value of any one of pixels vertically or horizontally adjacent to the target pixel may be set to the forced output value.

Moreover, the embodiment is configured to refer to the input value of the target pixel, and to determine whether or not the target pixel is the isolated point when it is determined that the target pixel is in the highlight portion, but whether or not the target pixel is the isolated point may be determined without determining whether or not the target pixel is in the highlight portion.

Furthermore, in the embodiment the setting of the forced output value by specifying input and the setting of the forced output value depending on the print count value can both be made by the forced output value setting section, but a configuration where the forced output value can be set by only one of them may be adopted. The forced output value may be held as a fixed value without providing the forced output value setting section. In this case, the forced output value is not limited to the value indicating halftones and may be the maximum value (255).

Moreover, in the embodiment the print count value is applied as information indicating the state of the image forming apparatus, but, a configuration where environmental information such as temperature and humidity of the image forming apparatus is input and the forced output value depending on the input environmental information is set may be adopted, for example.

The present U.S. patent application claims a priority under the Paris Convention of Japanese patent application No. 2010-163467 filed on 21 Jul. 2010, in which all contents of this application are disclosed, and which shall be a basis of correction of an incorrect translation.

What is claimed is:

1. An image processing apparatus comprising a programmed processor, the programmed processor having a plurality of sections, comprising:
   a pixel value conversion section which performs binarization processing to binarize a pixel value of a target pixel in multi-valued image data based on a predetermined threshold to output the binarized pixel value as an output value;
   an isolated point determination section which determines whether or not the target pixel is an isolated point;
   a feedback calculation section which calculates one or more feedback values obtained by multiplying one or more binarized pixel values of one or more processed pixels adjacent to the target pixel by a predetermined feedback coefficient;
   a feedback addition section which adds the one or more feedback values calculated by the feedback calculation section to the pixel value of the target pixel before binarization by the pixel value conversion section;
   an error diffusion section which diffuses a difference between the pixel value of the target pixel binarized by the pixel value conversion section and the pixel value of the target pixel before addition by the feedback addition section as an error to one or more pixel values of one or more unprocessed pixels adjacent to the target pixel; and
   an error subtraction section which subtracts the error diffused by the error diffusion section from the pixel value of the target pixel before the addition by the feedback addition section,
   wherein the isolated point determination section determines whether or not the target pixel is in a highlight portion, determines whether or not the target pixel is the isolated point when the isolated point determination section determines that the target pixel is in the highlight portion, and determines that the target pixel is an isolated point when all of the pixel values of one or more processed pixels arranged in predetermined adjacent positions with respect to the target pixel are 0, and when the output value of the target pixel is a maximum value, and
   the pixel value conversion section sets an output value of a predetermined adjacent pixel adjacent to the target pixel determined to be the isolated point to a predetermined forced output value excluding 0.

2. The image processing apparatus of claim 1, wherein
   the one or more processed pixels arranged in adjacent positions with respect to the target pixel is one or more processed pixels adjacent to the target pixel, and
   when all of the feedback values added to the pixel value of the target pixel by the feedback addition section are 0, the isolated point determination section determines that all of the pixel values of the one or more processed pixels arranged in the predetermined adjacent positions with respect to the target pixel are 0.

3. The image processing apparatus of claim 1, wherein when the pixel value of the target pixel is output as the predetermined forced output value by the pixel value conversion section, the error diffusion section diffuses the difference between the pixel value as the predetermined forced output value and the pixel value of the target pixel before the addition by the feedback addition section as the error to the one or more pixel value of the one or more unprocessed pixels adjacent to the target pixel.

4. The image processing apparatus of claim 1, wherein
   the image data including a plurality of pixels arranged in a matrix shape, and
   the pixel value conversion section performs the binarization processing while sequentially moving the target pixel in a main scanning direction and sets the pixel to be processed next to the target pixel determined to be the isolated point to the predetermined forced output value.

5. The image processing apparatus of claim 1 further comprising:
   a forced output value setting section which sets the forced output value,
   wherein the pixel value conversion section sets the output value of the predetermined adjacent pixel adjacent to the target pixel determined to be the isolated point to the value set by the forced output value setting section.

6. The image processing apparatus of claim 5, wherein the forced output value setting section is capable of receiving a specifying input of the forced output value, and when receiving the specifying input of the forced output value, sets the forced output value to a value of the specifying input.

7. The image processing apparatus of claim 5, wherein the forced output value setting section is capable of receiving information output from an image forming apparatus which forms an image on paper, which information indicates a state of the image forming apparatus, and when receiving the information indicating the state of the image forming apparatus, sets the forced output value to the value corresponding to the received information.

8. An image processing method comprising the steps of:
   performing binarization processing to binarize a pixel value of a target pixel in multi-valued image data based on a predetermined threshold to output the binarized pixel value as an output pixel value;
   calculating one or more feedback values obtained by multiplying one or more binarized pixel values of one or more processed pixels adjacent to the target pixel by a predetermined feedback coefficient;
   adding the one or more feedback values calculated in the feedback calculation step to the pixel value of the target pixel before binarization in the output pixel value determining processing step;
   diffusing a difference between the pixel value of the target pixel binarized in the output pixel value determining processing step and the pixel value of the target pixel before addition in the feedback addition step as an error to one or more pixel values of one or more unprocessed pixels adjacent to the target pixel; and
   subtracting the error diffused in the error diffusion step from the pixel value of the target pixel before the addition in the feedback addition step,
   wherein, in the output pixel value determining processing step, it is determined whether or not the target pixel is in a highlight portion, determined whether or not the target pixel is an isolated point when it is determined that the target pixel is in the highlight portion, and when all of the pixel values of one or more processed pixels arranged in predetermined adjacent positions with respect to the target pixel are 0, and when the output value of the target pixel is a maximum value, it is determined in the output pixel value determining processing step that the target pixel is the isolated point and an output value of a predetermined adjacent pixel adjacent to the target pixel determined to be the isolated point is set to a predetermined forced output value excluding 0.

9. A non-transitory, computer-readable medium comprising instructions for causing a computer to execute the steps of:
- performing binarization processing to binarize a pixel value of a target pixel in multi-valued image data based on a predetermined threshold to output the binarized pixel value as an output pixel value;
- calculating one or more feedback values obtained by multiplying one or more binarized pixel values of one or more processed pixels adjacent to the target pixel by a predetermined feedback coefficient;
- adding the one or more feedback values calculated in the feedback calculation step to the pixel value of the target pixel before binarization in the output pixel value determining processing step;
- diffusing a difference between the pixel value of the target pixel binarized in the output pixel value determining processing step and the pixel value of the target pixel before addition in the feedback addition step as an error to one or more pixel values of one or more unprocessed pixels adjacent to the target pixel; and
- subtracting the error diffused in the error diffusion step from the pixel value of the target pixel before the addition in the feedback addition step, wherein, in the output pixel value determining processing step, it is determined whether or not the target pixel is in a highlight portion, determined whether or not the target pixel is an isolated point when it is determined that the target pixel is in the highlight portion, and when all of the pixel values of one or more processed pixels arranged in predetermined adjacent positions with respect to the target pixel are 0, and when the output value of the target pixel is a maximum value, it is determined in the output pixel value determining processing step that the target pixel is the isolated point and an output value of a predetermined adjacent pixel adjacent to the target pixel determined to be the isolated point is set to a predetermined forced output value excluding 0.

* * * * *